UNITED STATES PATENT OFFICE.

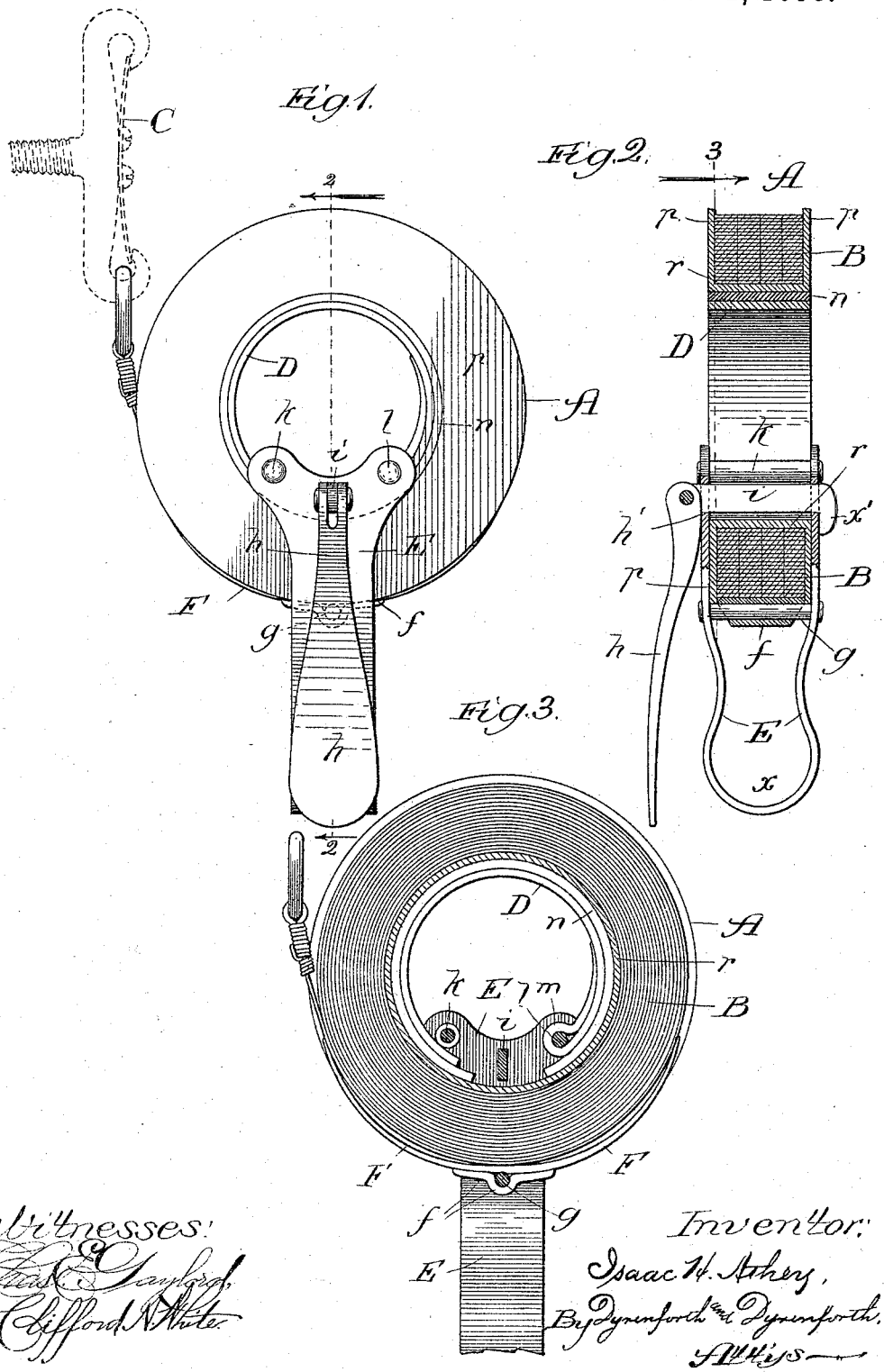

ISAAC H. ATHEY, OF CHICAGO, ILLINOIS, ASSIGNOR OF TWO-THIRDS TO W. W. SIMPSON AND HENRY J. SIEVERS, OF SAME PLACE.

FIRE-ESCAPE.

SPECIFICATION forming part of Letters Patent No. 492,180, dated February 21, 1893.

Application filed May 20, 1892. Serial No. 433,691. (No model.)

*To all whom it may concern:*

Be it known that I, ISAAC H. ATHEY, a citizen of the United States, residing at Chicago, in the county of Cook and State of Illinois, have invented a new and useful Improvement in Fire-Escapes, of which the following is a specification.

My invention relates to an improvement in the class of portable, or pocket, fire-escapes in which a metal tape on a reel is adapted to be fastened at its free end to a suitable object in a room, whence the escape (as through a window) is to be effected by suspension of the body of the user on the reel from the point of so securing the tape and uncoiling the latter by the weight of the suspended body to lower it to a position of safety.

The object of my improvement is to provide a construction of fire-escape of the class referred to, which shall be simpler and more convenient of use than other fire-escapes in the same class; and it is further my object to provide an especially convenient and effective, though simple, brake for the reel, which shall operate automatically to regulate the speed of paying off of the tape, and accordingly that of the descent, according to the weight of the body of the user suspended on the reel.

A further object of my improvement is to adapt the brake to be controlled by hand, whereby the user of the fire-escape may, at will, check his descent at any point thereof.

In the accompanying drawings, Figure 1 is a view in side elevation of my improved fire-escape, showing, by a dotted representation, a screw-clasp to which the free end of the metal tape is attached and whereby it may be readily fastened to a window-sill, or the like. Fig. 2 is a section taken on the line 2—2 of Fig. 1 and viewed in the direction of the arrows. Fig. 3 is a section taken on the line 3 of Fig. 2 and viewed as indicated by the arrow.

The salient features of my improved construction are an annular reel, a suitable tape coiled upon the reel, and a brake in the annulus of the reel adapted to co-operate with the annular surface thereof to control the rotation of the reel under the strain of a body suspended on it and the consequent paying-off speed of the tape under the strain of the weight.

A is the annular reel, which should be of metal. The preferred form of the reel is that illustrated, involving a hollow cylindrical center piece $r$ from opposite edges of which project, perpendicularly, the circular flanges $p$, affording a circumferential guide-recess for the tape B, fastened at one end to the reel and coiled about the body thereof, and which should be formed of adequately strong metal, preferably steel, to sustain any weight for which the device is intended to be used. As shown, the free end of the tape carries a ring $q$, at which it may be hooked on a clasp C having a screw-stem to be inserted into a suitable object, as the sill of a window out of which the escape may be effected. The particular attaching means, however, is not essential to my improvement, though some means should be provided on the free end of the tape to facilitate fastening thereof.

Inside the annular base $r$, I provide a washer $n$, preferably of leather; and inside the washer is a springy split-metal, or expansion, ring D, compressed into place, one end of which is formed into an eye $m$ carrying a pin $l$.

E is a hanger, shown as a bifurcated bracket, or loop, embracing, at corresponding corners of its two arms, endwise the pin $l$, the ends of the pin passing through the arms of the hanger, which is thus suspended on the split ring D. A roller $k$ is journaled in the hanger E to extend between the arms thereof toward its opposite corner and thus bear against the inner surface of the ring D near its free end. A bar $i$ extends through the arms of the hanger E transversely across the inner base of the body of the annular reel, and has pivotally fastened to its projecting end, which extends loosely through the adjacent hanger-arm, a lever $h$, the head-portion $h'$ of which bears against the surface of the hanger-arm. The hanger E is fulcrumed by a pin $g$ extending across the outer circumference of the reel through an eye $f$ suitably fastened to the reel, by preference yieldingly and then through the medium of a flat spring F extending from its opposite sides to bear against the surface of the coil of tape on the reel and thus hold it against too ready, or unintentional, unwinding, besides affording means for re-coiling it on the reel, when uncoiled by use, by employing the hanger as a handle and turning it (with the collar D) about the reel, or the reel about the collar, (the latter affording a species of hub for the reel) whereby an end of the spring F bears on the tape and induces taut winding thereof on the reel. As will be observed the spring F carrying the bearing-eye $f$ for the hanger-fulcrum pin $g$ is tightly clamped against the periphery of the reel (or surface of the tape thereon) by the connection of the hanger with the ring D at the pin $l$.

To use my improved fire escape, a strap (not shown) is to be passed, at $x$, through the hanger E and fastened about the body, under the arms of the user, who then fastens, or has previously fastened, the free end of the tape in place. If the escape is made, as would more commonly be the case, out of a window, the user suspends himself out of the same through the medium of the device fastened to him, as described, and will descend gradually to a place of safety. The brake is formed by the split ring D and the connection therewith of the hanger. The weight of the body of the user is exerted through the hanger E, at which he is suspended, on the roller $k$, which being loosely supported on the curved inner surface of the split ring, tends, under the strain of the weight, to roll downward toward the free extremity of the friction or brake ring D, but is resisted by the pin $l$ at the opposite corners of the arms of the hanger in the eye $m$ on the other end of the split ring, which yields under the strain and in so doing expands outwardly against the inner surface of the washer $r$ thereby compressing it at its outer surface against the inner annular surface of the reel and binding the latter against unduly rapid rotation. As will be seen, the greater the weight of the suspended body, the greater the strain on the split ring and, consequently, the greater will be the binding or friction-braking effect on the reel, which thus regulates itself according to the weight of the user.

It should be stated that, by way of precaution, I provide my improved fire-escape to the trade in different grades of normal resistance, each adapted to be used for bodies within a predetermined range of weight.

The user is supposed, while descending, to hold the free end of the hanger E in his grasp, and thereby have also in his hand the lever $h$, forming part of a supplementary hand-brake. Should he, then, desire to check the rotation of the reel and consequent paying out of the tape, he can accomplish that purpose by pressing the lever, whereby the head-end $h'$ thereof exerts a pull on the bar $i$, which, by being fastened at its end $x'$ to the adjacent arm of the hanger E, binds the latter then against the sides of the reel and ends of the pin $l$, while the head of the lever $h$ is at the same time pressed against the surface of the opposite arm of the hanger and similarly binds it, thus checking rotation of the reel.

From the foregoing description, it will be apparent that, among other advantages, my improved construction of fire-escape is peculiarly simple, being devoid of any form of shield supporting frame or clamping plates for the reel and attendant mechanism for fastening them in place; and that the construction affords the peculiar advantage of enabling the user of the device, himself, to recoil the tape after use, thus without requiring the device to be sent to the repair shop to be placed in condition for further use.

What I claim as new, and desire to secure by Letters Patent, is—

1. In a fire-escape, the combination of an annular tape-reel provided with means of attachment to the body of the user, and a self-acting brake for the reel in the annulus thereof and regulable by the weight of the attached body, substantially as described.

2. In a fire-escape, the combination of an annular tape-reel provided with means of attachment to the body of the user, and a self-acting brake for the reel, in the annulus thereof and regulable by the weight of the attached body, and provided with a supplementary hand-brake, substantially as described.

3. In a fire-escape, the combination of an annular reel for the suspension-tape, an expansion-ring in the annulus of the reel and a hanger co-operating, under the strain of the suspended weight, with the expansion-ring to brake the reel, substantially as described.

4. In a fire-escape, the combination of an annular reel for the suspension-tape, an expansion-ring in the annulus of the reel, and a hanger fastened to one end of the expansion-ring and loosely bearing against the adjacent end thereof, substantially as and for the purpose set forth.

5. In a fire-escape, the combination of an annular reel carrying the suspension-tape, an expansion-ring in the annulus of the reel, a hanger suspended on one end of the expansion-ring and loosely bearing against the adjacent end thereof and fulcrumed at the periphery of the reel, and a spring extending from the hanger-fulcrum along the perimeter of the reel, substantially as and for the purpose set forth.

6. A fire-escape comprising, in combination, an annular reel A carrying a tape B, a washer $n$ and a split ring D inside the annulus of the reel, a hanger E suspended on one end of the ring and loosely bearing against the adjacent end thereof, said hanger being fulcrumed at the periphery of the reel, a spring F extending from the hanger-fulcrum along the perimeter of the reel, and a supplemental hand-lever brake on the hanger, substantially as and for the purpose set forth.

ISAAC H. ATHEY.

In presence of—
M. J. FROST,
J. N. HANSON.